United States Patent [19]

Cullen

[11] 3,990,872

[45] Nov. 9, 1976

[54] ADSORBENT PACKAGE

[75] Inventor: John S. Cullen, Buffalo, N.Y.

[73] Assignee: Multiform Desiccant Products, Inc., Buffalo, N.Y.

[22] Filed: Nov. 6, 1974

[21] Appl. No.: 521,180

[52] U.S. Cl. .................................. 55/274; 55/515; 426/415; 206/204; 229/48 T; 229/53; 210/DIG. 6

[51] Int. Cl.² ........................................ B01D 53/04

[58] Field of Search ............ 55/274, 275, 279, 384, 55/387, 388, 389, 512, DIG. 13, 515, 528; 206/459.7, 439, 204; 229/53, 62, 66, 48 T; 210/288, DIG. 6; 426/115, 415

[56] References Cited
UNITED STATES PATENTS

| | | | |
|---|---|---|---|
| 2,578,324 | 12/1951 | Southwick, Jr. | 55/387 |
| 2,635,742 | 4/1953 | Swartz et al. | 229/3.5 R |
| 2,838,795 | 6/1958 | Lockwood | 55/387 X |
| 3,309,849 | 3/1967 | Ward | 55/387 |
| 3,547,257 | 12/1970 | Armentrout | 229/66 |
| 3,685,720 | 8/1972 | Brady | 229/62 |
| 3,734,296 | 5/1973 | Proctor et al. | 210/DIG. 6 |
| 3,761,013 | 9/1973 | Shuster | 229/62 |
| 3,770,119 | 11/1973 | Hultberg et al. | 206/439 |

OTHER PUBLICATIONS

It's Paper . . . Sheet . . . Fabric . . . It's Spunbonded, Modern Plastics, Apr., 1968, pp. 93–95.

*Primary Examiner*—Frank W. Lutter
*Assistant Examiner*—David L. Lacey
*Attorney, Agent, or Firm*—Joseph P. Gastel

[57] ABSTRACT

An adsorbent package comprising spunbonded olefin wall means, and adsorbent means confined by said wall means, said wall means being fabricated from planar sheet material formed into tubular shape and having a heat and pressure sealed seam which causes the spunbonded olefin material to become transparent in the area of the seam to permit viewing of the adsorbent therethrough.

6 Claims, 3 Drawing Figures

ADSORBENT PACKAGE

The present invention relates to an improved adsorbent package of the type which is placed in an environment for the purpose of adsorbing moisture or gases.

By way of background, in the past, adsorbent packages included a wall fabricated of porous paper housing adsorbent material. However, packages of this type had certain disadvantages, namely, if they were exposed to water the contents of the package would be ruined or the package wall itself would disintegrate. Also, the paper, being porous, was very fragile so that reasonable care had to be utilized in handling the packages lest they tore and spilled their contents. In addition, many of the papers which were used for packaging contained sulphur compounds which rendered them objectionable for certain applications where such sulphur could not be tolerated, and many papers also included objectionable compounds in the heat-sealing material coated on the paper, the most common being polyvinyl chloride. Furthermore, the paper packaging material was not transparent so that it was impossible to view the adsorbent for the purpose of determining its condition. It is with overcoming the foregoing deficiencies of prior type adsorbent packages that the present invention is concerned.

It is accordingly one important object of the present invention to provide an improved adsorbent package which will pass water vapor and gases, but which will be highly resistant to the passage of liquid, such as water, so that its efficacy will not be impaired in the event that it should be exposed to liquid.

Another object of the present invention is to provide an improved adsorbent package which is fabricated of a material which is highly tear and puncture resistant and therefore the possibility that the contents will be spilled is virtually obivated.

Another object of the present invention is to provide a container for an adsorbent which has improved seam strength because the seam results from fusing the walls of the material itself and does not depend on the sealing resulting from the fusing of only a coating on the walls. A related object of the present invention is to provide an adsorbent package which is highly compact because the improved seal strength permits relatively tight packing of the adsorbent.

Yet another object of the present invention is to provide an improved adsorbent package fabricated from a material which can be rendered transparent by the application of heat and pressure so as to permit the package to contain a window through which the adsorbent can be viewed to determine its condition.

A further object of the present invention is to provide an improved adsorbent package having a wall material which is highly inert so that it will not affect either the environment in which it is placed or the adsorbent material which it contains. Other objects and attendant advantages of the present invention will readily be perceived hereafter.

The improved adsorbent package of the present invention comprises spunbonded olefin wall means, and adsorbent means confined within said wall means. In its more specific aspects, the package includes a wall having a portion which has been subjected to heat and pressure so as to cause the normally opaque wall to become transparent so as to permit viewing of the adsorbent within the package. The various aspects of the present invention will be more fully understood when the following portions of the specification are read in conjunction with the accompanying drawings wherein.

Figure 1:
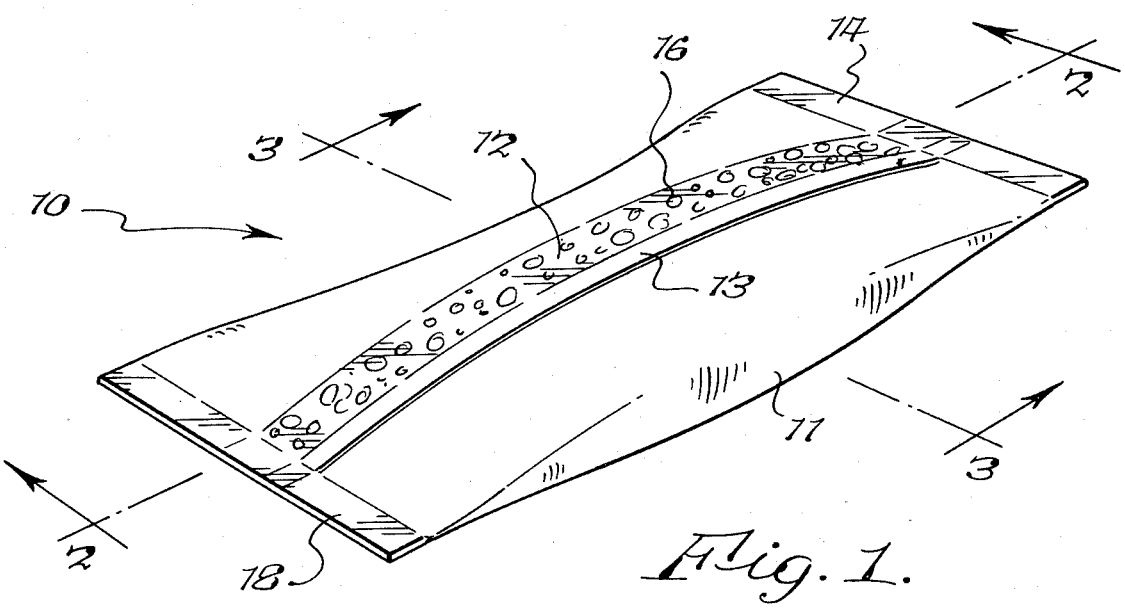
FIG. 1 is a perspective view of the improved adsorbent package of the present invention.
Figure 2:
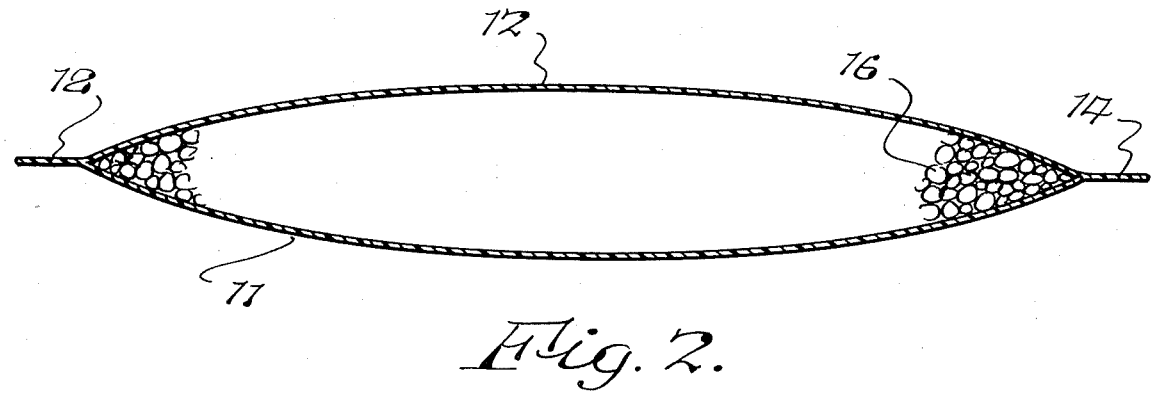
FIG. 2 is a fragmentary cross sectional view taken substantially along line 2—2 of FIG. 1.
Figure 3:
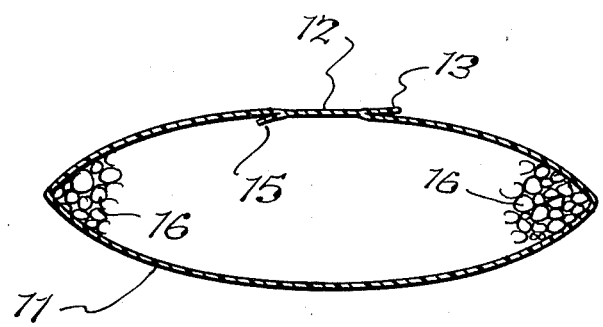
FIG. 3 is a fragmentary cross sectional view taken substantially along line 3—3 of FIG. 1.

The improved adsorbent package 10 of the present invention includes a wall portion 11 fabricated from a flexible planar sheet member which has been folded into tubular form and fused along overlapping edge portions 13 and 15 to provide a seam 12. The fusing is effected by placing the tubular shape over a mandrel and applying sufficient heat and pressure to fuse the area to be sealed. The end portion is then fused at 14 as by heat and pressure, and package 10 is filled with desiccant pellets 16. Thereafter the other end portion is fused at 18, as by heat and pressure, to close the package.

The entire package 10 is fabricated from spunbonded olefin, which comprises high density polyethylene fibers which were combined by an integrated spinning and bonding process, and this material provides a number of highly desirable advantages. First of all, this material will transmit water vapor and gases from the environment in which package 10 is placed. However, this material will not pass water in a liquid form. Therefore package 10 will not have its efficacy impaired in the event it is exposed to liquid water. By way of contrast, prior type adsorbent packages of the type herein under consideration were fabricated with a wall made of porous paper, such as teabag paper, which obviously would pass water and therefore permit the desiccant within the package to be ruined. In addition, the water would weaken the paper wall so that it could rupture, causing the contents of the package to spill. The wall 10, however, will not weaken when exposed to water.

In addition to the foregoing, the virtually opaque spunbonded olefin material 11 becomes transparent in the areas in which it has been fused. Therefore the seam area 12 comprises a window extending longitudinally of package 10 which permits viewing of the adsorbent within the package. If the adsorbent is of the type having a cobalt chloride salt therein for indicating the activity of the adsorbent, the color can be observed through window 12 to determine whether the adsorbent is still active. In addition, if desired, an indicating paper (not shown) may be placed in package 10 immediately adjacent the window portion 12 to act as an indicator of the condition of the adsorbent. The window portion 12 has less moisture vapor transmission capability than the remainder of the wall 11, and therefore the adsorbent immediately adjacent thereto will be the last to be affected by the vapor being transmitted through wall 11. Therefore if an indicating material is used as the adsorbent, the portion adjacent the window 12 will be one of the last portions to change color and therefore a premature indication of saturation of the adsorbent will not be obtained.

The material from which wall 11 is fabricated is extremely strong, many times stronger than paper. It cannot be torn under normal use conditions and therefore this strength is a feature which is not obtainable with paper-walled packages. Therefore the possibility of spilling the adsorbent 16 from package 10 as the result of tearing is a very remote possibility, and practically impossible. This permits package 10 to be used in environments where tearing of the package cannot be tolerated.

The material from which wall 11 is made is non-corrosive in the sense that it is inert when compared to sulphur bearing paper products previously used in packaging. Accordingly, for this reason also the package 10 may be used in environments where sulphur bearing paper packages cannot be tolerated.

Representative fillers 16 which may be contained within package 10 are silica gel, activated carbon, bentonite, montmorillonite, molecular sieve, and any other type of desiccant or adsorbent which is desired. It is to be especially noted that the material from which wall 11 is fabricated is inert relative to the fillers and therefore there will be no reaction therewith.

While package 10 has been depicted in tubular form after having been fabricated from planar sheet material and having a heat-sealed seam and heat sealed ends, it will be appreciated that the spunbonded olefin, such as utilized in wall 11, may be used as a cover or a wall of any other type of container to provide the same characteristics obtained with the package depicted in the drawings. Furthermore, if desired, a portion of such a wall may be made transparent by applying heat and pressure in the same manner as the heat and pressure which is applied to provide the heat-sealed window type seam 12.

A spunbonded olefin which has been found satisfactory can be obtained commercially under the trademark TYVEK, Style 1058, of the DuPont Company, and it is fabricated from high density polyethylene by an integrated spinning and bonding process. It has a weight of approximately 1.6 ounces for seven-ninths of a square yard, and a thickness of approximately 5 mils. It will be appreciated, however, that other weights of material can be used to obtain different vapor transmission characteristics.

While preferred embodiments of the present invention have been disclosed, it will be appreciated that it is not limited thereto but may be otherwise embodied within the scope of the following claims.

What is claimed is:

1. An adsorbent package comprising a package fabricated entirely from virtually opaque spunbonded olefin sheet which will pass gases but not water and which is folded over on itself to produce a tubular member having first, second and third overlapping sheet portions, a first heat sealed seam joining said first overlapping sheet portion centrally on said package and providing a transparent area on said package, second and third spaced heat sealed seams joining said second and third overlapping sheet portions to provide end seams on said package whereby said first, second and third seams cause said package to be completely enclosed, and adsorbent completely contained within said package with a portion of said adsorbent being in contiguous relationship to said first seam whereby said adsorbent can be viewed from outside of said package through the transparent area provided by said first seam.

2. An adsorbent package as set forth in claim 1 wherein said olefin is high density polyethylene.

3. An adsorbent package comprising spunbonded olefin wall means which will pass gases but not water, and adsorbent means confined by said wall means, said wall means including a fused area which is transparent to permit viewing of said adsorbent means therethrough.

4. An adsorbent package as set forth in claim 3 wherein said wall means comprise a tubular member, said tubular member being fabricated from planar sheet material having an overlapping portion which is fused to provide a seam which also is said transparent fused area.

5. An adsorbent package comprising supnbonded olefin wall means which will pass gases but not water, adsorbent means confined by said wall means, said wall means comprising a tubular member, and said tubular member including a fused area which is transparent to permit viewing of said adsorbent means therethrough.

6. An adsorbent package as set forth in claim 5 including sealed ends on said tubular member.

* * * * *